United States Patent

Lahr

[15] 3,648,387
[45] Mar. 14, 1972

[54] EDUCATIONAL AID

[72] Inventor: Roy J. Lahr, Westport, Conn.
[73] Assignee: Xerox Corporation, Rochester, N.Y.
[22] Filed: Nov. 24, 1969
[21] Appl. No.: 879,486

[52] U.S. Cl. ........................... 35/8 A, 179/100.2 T, 274/4 J
[51] Int. Cl. ........................... G09b 5/06, G11b 5/00
[58] Field of Search ........... 35/8 A, 35 C; 274/11, 13, 4.2, 274/4 J, 9 B; 179/100.2 CA, 100.2 T

[56] References Cited

UNITED STATES PATENTS

| | | | |
|---|---|---|---|
| 3,086,297 | 4/1963 | Kantrowitz | 35/35 C |
| 3,185,776 | 5/1965 | Bender | 179/100.2 T |
| 3,251,263 | 5/1966 | Gerry | 179/100.2 T X |
| 3,471,654 | 10/1969 | Dollenmayer | 179/100.2 T |
| 3,516,175 | 6/1970 | Kobler et al. | 35/35 C X |

*Primary Examiner*—Wm. H. Grieb
*Attorney*—James J. Ralabate, John E. Beck and Benjamin B. Sklar

[57] ABSTRACT

An educational aid through which printed information intelligence is coordinated with an audio reproduction to selectively produce an audio presentation of the printed information. A record member operatively associated with a text of printed information and having recorded thereon a reproducible audio recording of the printed information is supported within a sound-reproducing apparatus. A transducer associated with the sound-reproducing apparatus is selectively positioned relative to the record member in response to the positioning of an indicator member at selected portions of the text material to generate an audio presentation of the particular text material.

7 Claims, 9 Drawing Figures

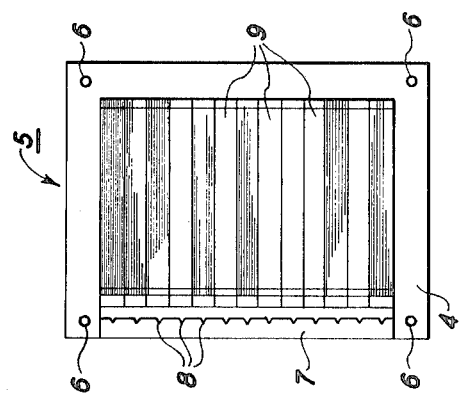
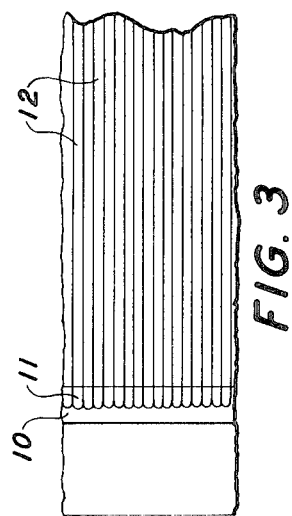
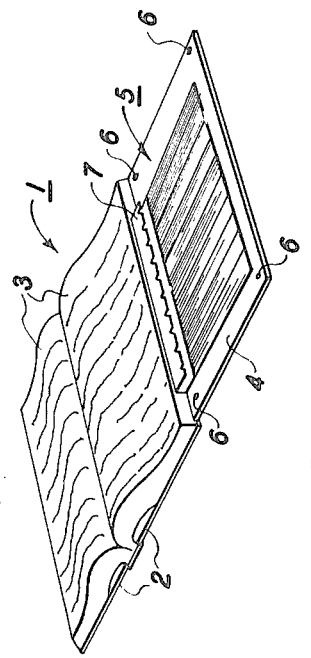
INVENTOR.
ROY J. LAHR

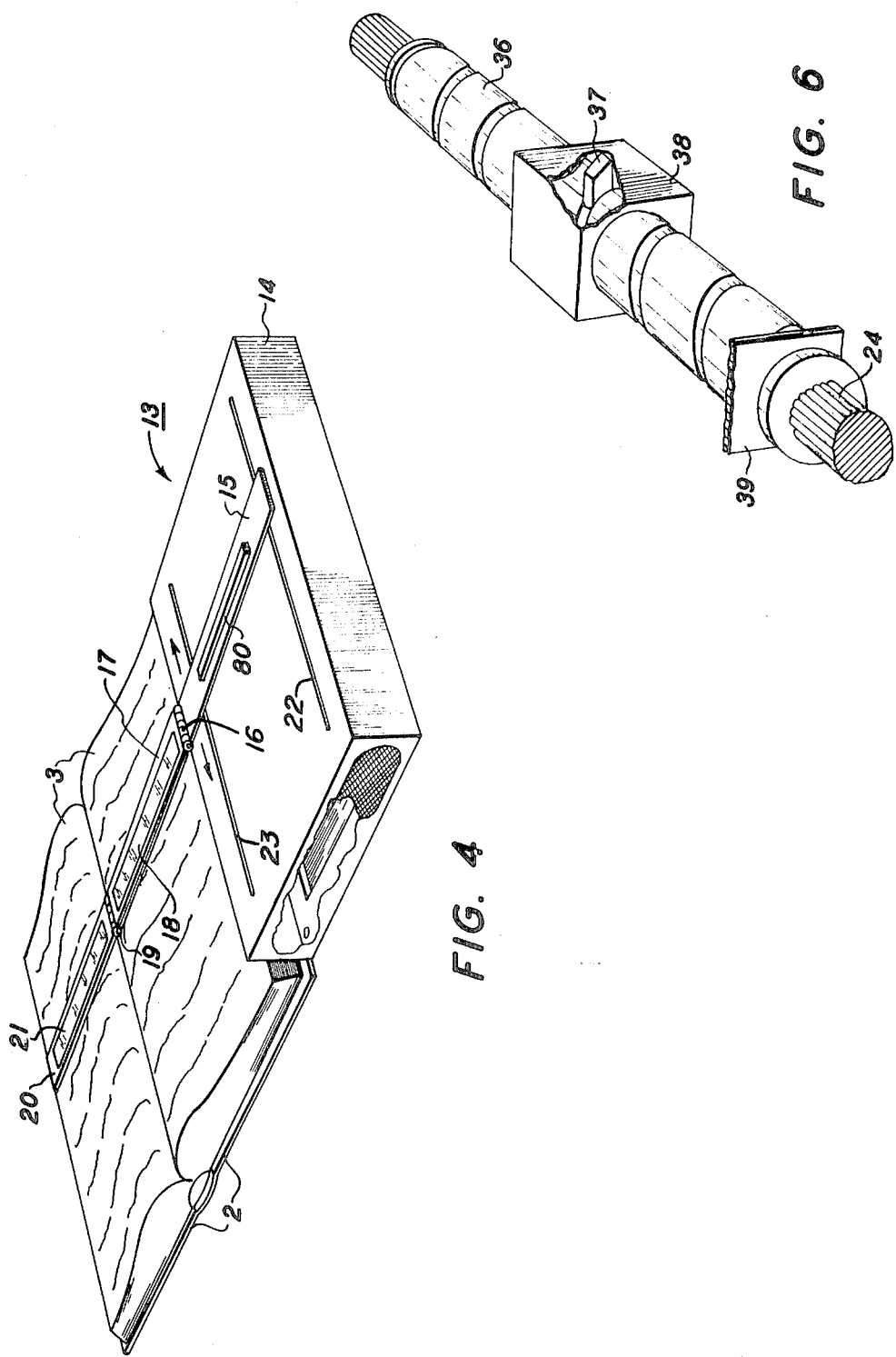

EDUCATIONAL AID

BACKGROUND OF THE INVENTION

This invention relates generally to educational aids and more particularly to an educational aid through which printed information intelligence is coordinated with an audio reproduction of the particular information intelligence.

It has long been recognized that the educational process can be accelerated and made more efficient through the use of a medium which operates to communicate with more than one of the perceptual sensors of the learner. For example, the learning process is accelerated through the use of teaching aids which are both audio and visual in their nature. Thus, in teaching pronunciation or speech for example, the learning process may be accelerated by providing a means which not only presents the particular characters, symbols, words or phrases in visual form but also which produces sounds corresponding or related to the selected characters, symbols, words or phrases. For beginning readers, or those studying foreign languages, it is extremely helpful to couple the written text with the spoken equivalent. In such instances it is also advantageous for the learner to refer to specific portions of the text material without reviewing the entire portion of the text.

Various teaching aids have heretofore been proposed in which sound-reproducing apparatus is coordinated with printed information such as a book for example. However, in most of the prior such educational devices, the construction and operation thereof have been unnecessarily complicated to the extent that they are not practical for use. This is particularly true in the case where the learner is a small child, or a person who may be suffering from either a mental or physical defect.

SUMMARY OF THE INVENTION

Accordingly, it is an object of the present invention to provide an educational aid for producing sounds corresponding to selected printed information intelligence.

It is another object of the present invention to provide sound-reproducing apparatus adapted for coordination with other intelligence bearing media.

It is still another object of the present invention to provide sound-reproducing apparatus adapted for coordination with a book.

It is still another object of the present invention to provide sound-reproducing apparatus adapted for use in conjunction with a book and the operation of which is highly simplified.

It is still a further object of the present invention to provide an improved sound-reproducing apparatus adapted for use in conjunction with a book which is small and compact and which may be readily transported and manipulated by the user.

It is yet a further object of the present invention to provide an improved book adapted for use in conjunction with a sound-reproducing apparatus.

It is yet a further object of the present invention to provide books and sound-reproducing apparatus adapted for use in coordinating audio information with printed information, the construction of which is sufficiently simple and rugged for use by young children or persons suffering from mental defects.

It is yet a further object of the present invention to provide an improved book construction especially adapted for use in conjunction with sound-reproducing apparatus.

It is yet a further object of the present invention to provide an improved book and sound record structure coordinated with each other for use in generating an audio reproduction of the information contained in the book.

These and other objects of the present invention are attained by means of a text of printed information which is operatively associated with a record member having recorded thereon a reproducible audio recording of the printed information in the text and sound-reproducing apparatus which is operatively associated with both the text and the record member to generate an audio presentation of selected portions of the text.

The sound-reproducing apparatus which includes a closure member adapted to receive the record member also includes means for positioning the record member and the text of printed information at a predetermined position relative to the closure member. A first carriage assembly is supported for movement within the closure member in a first direction relative to the record member and a second carriage assembly is associated with the first carriage assembly and is adapted for movement in a second direction relative to the record member transverse to the direction of movement of the first carriage assembly.

A transducer means, operatively associated with the second carriage assembly, is selectively positioned relative to the record member on the first carriage assembly in response to the positioning of an indicator member at selected portions of the text material. As the second carriage assembly is selectively driven in the path of movement across the record member, the transducer means generates an audio presentation of the information contained in selected portions of the text material.

Other objects of the present invention will become readily apparent to those skilled in the art in view of the following detailed disclosure and description thereof, especially when read in conjunction with the accompanying drawings.

BRIEF DESCRIPTION OF THE DRAWINGS

FIG. 1 is a perspective view of a text and associated record member is contemplated by the present invention.

FIG. 2 is a plan view of the record member of FIG. 1.

FIG. 3 is an enlarged portion of the record member of FIG. 2.

FIG. 4 is a perspective view of a text and associated record member as used in conjunction with a sound-reproducing apparatus as contemplated by the present invention.

FIG. 6 is a view of an enlarged portion of the carriage support and drive of FIG. 5.

DESCRIPTION OF THE PREFERRED EMBODIMENTS

Figure 5:
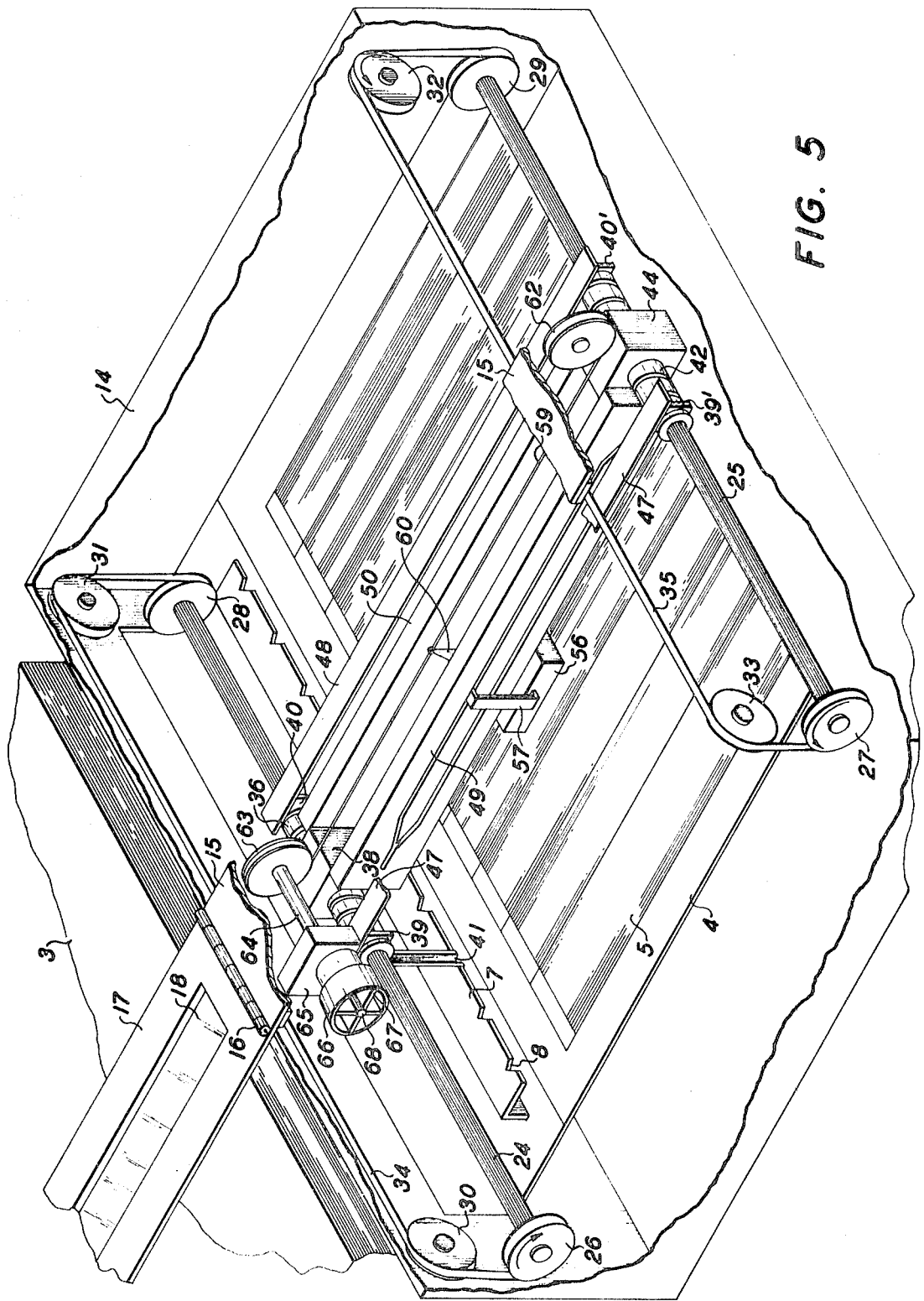
FIG. 5 is a partly broken away schematic illustration of the sound-reproducing apparatus of FIG. 4.

Referring to FIG. 1 of the drawings, there is illustrated a book, generally designated 1, as contemplated by the present invention. As illustrated therein, book 1 includes textual information printed upon pages 3 which are bound within a cover in a more or less conventional manner. However, unlike conventional books, book 1 includes a flap 4 which is hinged from the cover 2 of the book 1. The flap 4 may be hinged from either that portion of the cover 2 which is generally known as the front cover of the book or that portion of the cover 2 which is generally known as the rear cover. According to the preferred embodiment, however, the flap 4 is connected to the rear cover of the book and is hinged along the edge thereof. Flap 4 via the hinge connecting it to the cover 2 may thus be folded inwardly inside cover 2 adjacent the flyleaf for ease in storing the book 1 in a conventional manner. However, for use as contemplated by the present invention the flap 4 will be described in the unfolded position as shown in FIG. 1.

A record member 5 having recorded thereon a reproducible audio presentation of the printed information in the text is supported on the flap 4 in a predetermined orientation relative to the printed information contained on pages 3. As may be seen from FIGS. 1–3, record member 5 includes a plurality of modulated groove recordings 12 from which an audio signal of the recorded information may be generated. Unlike conventional record members in which the grooves extend in a spiral configuration about a central point, the grooves in record member 5 according to the present invention extend transversely across the width of the record member 5. As may be seen from FIG. 2, the record member 5 is divided into a plurality of zones 9 extending along the length thereof, each zone of which corresponds to a particular page in book 1. Within a particular zone 9, the individual grooves 12 correspond to the various lines of print on a particular page of the book. As may be seen from FIG. 3, each of the zones 9 includes at the left end portion thereof an area 10 wherein no information is recorded on the record member 5 to provide a zone at which a transducer arrangement is brought into engagement with the individual grooves in record member 5. As may also be seen from FIG. 3, adjacent area 10 is located a transition zone 11 at which the grooves are slightly tapered so as to provide a guide in bringing the transducer arrangement into engagement with a particular groove 12 on the record member 5.

As may be seen from FIGS. 1 and 2, a plurality of index pins 6 which project above the surface of flap 4 are utilized in aligning the record member 5 and the text material with a sound-reproducing apparatus to be hereinafter more fully described. Indexing pins 6 may be formed separately from record member 5 and individually attached to flap 4. However, in the preferred arrangement, indexing pins 6 are formed integrally with record member 5 to provide accurate registration of the record member 5 with the sound-reproducing apparatus. Although the record member 5 as contemplated by the present invention is of a novel configuration, unlike more conventional recordings in which the sound grooves extend in a spiral manner about a central point, it is nevertheless contemplated that the record member 5 be formed, for example, on a plastic material by hot pressing from a master in much the same manner as is used to produce the more conventional spiral recordings. It is therefore possible to form indexing pins 6 in the plastic at the time that the record member 5 is pressed, to provide accurate registration of the record member 5 with the sound-reproducing apparatus.

An indexing member 7 having a plurality of indexing notches 8 extending therealong is attached to the left-hand portion of the record member 5 as may be seen from FIGS. 1 and 2. In the preferred arrangement, indexing member 7 is supported slightly above the surface of record member 5 in spaced relationship from the record member 5. The various indexing notches 8 extending along the length of indexing member 7 correspond to the various zones 9 of record member 5. Indexing notches 8 are thus utilized in positioning the sound-reproducing apparatus to be hereinafter more fully described in relation to the various zones 9 on record member 5. Indexing member 7 may be attached to record member 5, or according to the preferred embodiment is formed integrally therewith at the time that the record member 5 is formed. This provides accurate correlation between the various indexing notches 8, the indexing pins 6, and the various zones 9 on record member 5.

The thus formed record member 5 is then attached to flap 4 by any suitable fastening means, with record member 5, indexing pins 6, and indexing notches 8 being correlated and aligned in a predetermined orientation relative to the printed information contained on the various pages 3 of the book 1.

Referring to FIGS. 4-9, there will be described a sound-reproducing apparatus which is especially adapted for generating an audio signal of information recorded on a record member such as that illustrated in FIGS. 1-3. The sound-reproducing apparatus 13, as contemplated by the present invention includes a closure member 14 within which the various subassemblies of the sound-reproducing apparatus are located. Closure member 14 includes an opening along the left-hand side thereof as seen in FIG. 4 into which the record member 5 on flap 4 is inserted. With the record member 5 and flap 4 inserted within the closure member 14, the book 1 is thus positioned alongside the sound-reproducing apparatus 13 as seen in FIG. 4, with the guide pins 6 associated with record member 5 being aligned with corresponding openings within closure member 14, which serve to align record member 5 and the pages 3 of the book 1 at a predetermined position relative to the sound-reproducing apparatus 13.

A cursor set bar 15 is supported on the top portion of closure member 14 and is moveable over the top surface of closure 14 in the longitudinal direction along longitudinally extending slots 22 and 23. Cursor set bar 15 includes a pair of projecting portions which extend inwardly within closure member 14 through slots 22 and 23 for attachment to the transducer positioning arrangement within closure member 14 to be hereinafter more fully described. A first cursor arm 17 is attached at the left-hand end of cursor set bar 15 as seen in FIG. 4 by means of hinge 16. Cursor arm 17 includes an aperture 18 suitably arranged therein and extends across the width of one of the pages 3 of the text material in book 1. A second cursor arm 20 is attached at the left hand end of cursor arm 17 by means of hinge 19. Cursor arm 20 includes an aperture 21 suitably arranged therein and extends across the left-hand portion of the pages 3 of book 1. When the sound-reproducing apparatus 13 is not in use, cursor arms 17 and 20 may be folded about the respective hinges 16 and 19 to reside in superposed relationship to cursor set bar 15. In the folded position, cursor arm 17 will thus be folded in a clockwise manner about hinge 16 as seen in FIG. 4 with cursor arm 20 being folded in a counterclockwise direction about hinge 19 thus resulting in a zigzag folding of the respective cursor arms over cursor set bar 15. In the operative position, however, cursor arms 17 and 20 respectively are in the unfolded extended position as seen in FIG. 4 with the cursor bar 17 extending across the right-hand pages 3 of the book 1 and the cursor bar 20 extending across the left-hand pages 3 of book 1. Also associated with cursor set bar 15 is sound-reproducing apparatus actuating switch 80 which is utilized in generating an audio output signal of the recorded information as will hereinafter be more fully described.

Referring to FIG. 5, the sound-reproducing apparatus 13 includes a pair of spaced, longitudinally extending, splined shafts 24 and 25. Shafts 24 and 25 are journaled for rotation within closure member 14 and are positioned therein adjacent the left- and right-hand sides of the closure member 14 respectively. A first pulley member 26 is attached to one end of shaft 24 to rotate therewith and a second pulley member 28 is attached at the other end of shaft 24 to rotate therewith. In similar manner, a first pulley member 27 is attached at one end of shaft 25 to rotate therewith and a second pulley member 29 is attached to the other end of shaft 25 to rotate therewith. A flexible drive member such as power cord 34, is attached at one end to pulley member 26 and at the other end to pulley member 28. Flexible drive cord 34 may comprise a minimum stretch woven metallic cable or a cable formed from a plastic material which has little or no stretch characteristics and which may be easily wound upon the respective pulley members 26 and 28. Power cord 34 is entrained about pulley members 26 and 28 and about a pair of idler pulleys 30 and 31 at either end of closure member 14. Centrally therealong, power cord 34 is attached to the respectively associated portion of cursor set bar 15 which projects within closure member 14 through longitudinally extending slot 23. In similar manner, a second power cord 35 is attached at one end thereof to pulley member 27 on shaft 25 and at the other end to pulley member 29 on shaft 25. Power cord 35 is entrained about pulley member 27 and pulley member 29 passing over a pair of idler pulleys 33 and 32 which are attached to closure member 14. Again in similar manner, power cord 35 is attached centrally therealong to the portion of cursor set bar 15 which projects through longitudinally extending slot 22 in closure member 14.

The mechanism by which an audio signal of the recorded information is generated from record member 5 is moveable in a longitudinal direction relative to record member 5 within closure 14 by means of a first carriage assembly and is moveable in a transverse direction relative to record member 5 within closure 14 by means of a second carriage assembly. First and second spindle shafts 36 and 42 are respectively supported on shafts 24 and 25. Spindle shafts 36 and 42 on the internal surface thereof are splined in the longitudinal direction in a mating arrangement with the respective shafts 24 and 25. This permits movement of spindle shafts 36 and 42 in the axial direction along shafts 24 and 25 respectively yet provides a rotation of spindle shafts 36 and 42 when the respective shafts 24 and 25 are rotated. Spindle shafts 36 and 42 are threaded about the external periphery thereof for a purpose which will hereinafter become apparent. The threads on spindle shafts 36 and 42 preferably extend in the right-hand direction about the periphery thereof for a purpose which will hereinafter become more readily apparent, but the threads on spindle shafts 36 and 42 may be arranged to extend in the left-hand direction depending on the manner in which power cords 34 and 35 are connected to the respective pulleys.

Spindle shafts 36 and 42 are grooved at either end thereof to support carriage bars 47 and 48. Carriage bar 47 extends transversely within closure member 14 and has connected at either end thereof clevises 39 and 39' which are respectively received by the grooves at one end of spindle shafts 36 and 42 respectively. A second carriage bar 48 extends transversely within closure member 14 between shafts 24 and 25 and has connected at either end thereof clevises 40 and 40' which are received by the grooves at the other of the ends of spindle shafts 36 and 42 respectively.

A spindle follower 38 is supported on spindle shaft 36 to permit a rotation of spindle shaft 36 within follower 38. A tine 37 as seen in FIG. 6 supported internally of carriage follower 38 and connected thereto projects inwardly to engage the threads along spindle shaft 36. In similar manner, a carriage follower 44 is supported on spindle shaft 42 to permit a rotation of spindle shaft 42 within carriage follower 44. A tine (not shown) supported internally of carriage follower 44 and connected thereto projects within the threads extending along spindle shaft 42. Thus upon rotation of shafts 24 and 25, spindle shafts 36 and 42 respectively associated therewith will be rotated thus advancing carriage followers 38 and 44 respectively in the axial direction along spindle shafts 24 and 25.

A second set of carriage bars 49 and 50 are connected to carriage followers 38 and 44 to extend transversely between shafts 24 and 25. It will thus be understood that carriage bars 47, 48, 49 and 50 may be longitudinally positioned within the closure member 14 along shafts 24 and 25 by movement of the carriage position detent 41 which is operatively connected thereto. Access to the detent 41 is attained through the opening in the closure member 14, as can be seen from FIG. 5.

Figure 7:
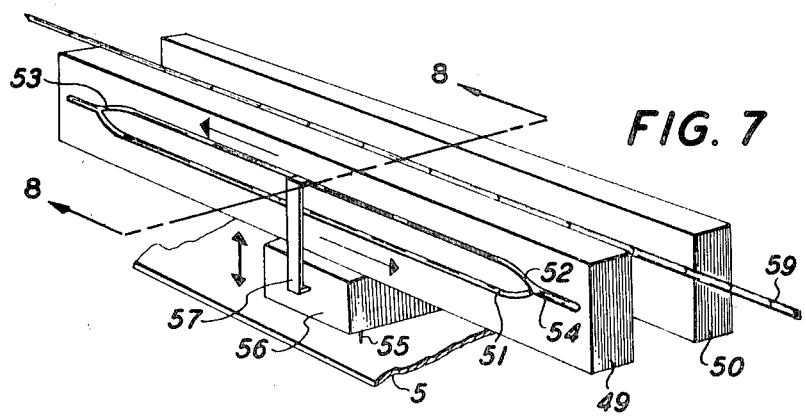
FIG. 7 is a perspective view of the transducer support and drive arrangement as contemplated by the present invention.
Figure 8:
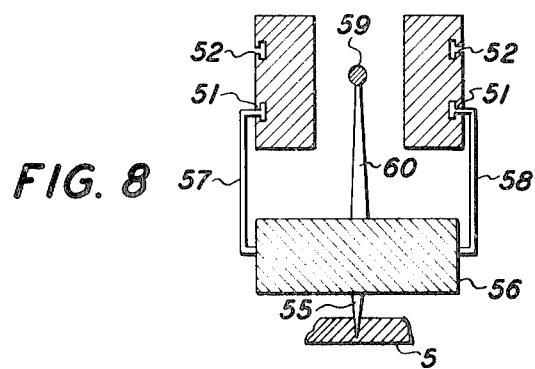
FIG. 8 is a cross-sectional view taken along the lines 8—8 of FIG. 7.

As may be seen from FIGS. 7 and 8, carriage bars 49 and 50 each include a first longitudinally extending groove 51 which may be referred to as a playback groove and a second longitudinally extending groove 52 which may be referred to as a return groove. The transducer means by which an audio signal is generated from the record member 5 is supported on a second carriage assembly for movement in a transverse position within sound-reproducing apparatus 13 relative to record member 5. Grooves 51 and 52 are spaced from each other on carriage bars 49 and 50 in the vertical direction medially therealong and converge at either end thereof to a single common groove. Flexible bistable elements 53 and 54 are supported in grooves 51 and 52 respectively to insure tracking of a follower element beginning at the left-hand portion of the common groove as seen in FIG. 7 into groove 51, then into the common groove at the right-hand end of carriage bar 49 then into groove 52 and back into the common groove of the left-hand portion of FIG. 7.

As may be seen from FIGS. 5-8, transducer means 56 is supported from carriage bars 49 and 50 to generate an audio signal of the recorded information. Transducer means 56 may comprise a ceramic head which is operatively connected to directly drive a set of sensitive earphones. Alternatively, transducer head 56 may comprise an acoustic head which is directly coupled to drive a set of acoustic earphones. A third alternative is that transducer head 56 may comprise a ceramic head which in turn is coupled to a simple amplifier circuit which in turn is coupled to a set of earphones and/or a speaker arrangement to generate an audible signal of the recorded information. Transducer head 56 is supported from carriage bars 49 and 50 by means of support arms 57 and 58. Support arms 57 and 58 include follower elements which extend into the respective grooves associated with carriage bars 49 and 50 to permit transverse movement of the transducer head 56 across record member 5. A stylus 55 which depends from transducer head 56 is adapted for engagement with selected grooves on record member 5 to generate an audio signal of the recorded information in a manner which is generally well known.

As may be seen from FIG. 8, transducer head 56 may be driven in the transverse direction across record member 5 by means of a flexible power cord 59 which is operatively connected to transducer head 56 via the transducer head drive link 60. The transducer head 56 and the stylus 55 associated therewith is driven across the record member 5 by means of the drive arrangement illustrated in FIGS. 5 and 9. As illustrated therein, the power cord 59 which may comprise a minimum stretch flexible member such as woven metallic cable or a cable formed from a plastic material which has little or no stretch characteristics is connected at one end to drive reel 62 and at the other end thereof is connected to rewind reel 62. Power cord 59 should therefore be of a sufficient length for a point therealong to traverse record member 5 as power head 59 is wound from one of the respective reels 62 or 63 onto the other of the respective reels 62 or 63. Power cord 59 is thus operatively connected to transducer head 56 via transducer head drive link 60. Drive reel 62 is operatively connected to a spring motor 61 which is utilized in driving transducer head 56 across record member 5 in the playback mode. Spring motor 61 is of the type which exerts a constant force on power cord 59 so as advance transducer head 56 across record member 5 at a uniformly constant velocity. Such type of spring motors are believed generally well known and a further discussion thereof is not believed necessary for a complete understanding of the present invention.

A first fork-shaped member 69 is positioned over power cord 59 with the tines of fork member 69 projecting downwardly over power cord 59. Fork member 69 is supported above power cord 59 by means of pivot 72. A second fork member 70 is positioned from fork member 69 in the direction of travel along power cord 59 with the tines thereof normally extending downwardly around power cord 59. A latch block 79 associated with fork member 70 is positioned above power cord 59 to engage the tines of fork member 70 and restrict fork member 70 against movement in the transverse direction to the right as viewed in FIG. 9. Fork member 70 is also supported from above power cord 59 by means of pivot 73 in a manner similar to fork 69. A tine 75 which is rigidly connected to fork member 69 for movement therewith about pivot 72 extends from fork 69 in a generally perpendicular relationship in the transverse direction along power cord 59. Tine 75 is operatively connected to fork member 70 by means of a suitably arranged aperture in fork 70 which permits tine 75 to extend through fork member 70. A lever arm 78 which is operatively connected to fork 70 via pivot 73, is operatively supported for pivotal movement from the frame of sound-reproducing apparatus 13 by means of pivot 77. Thus as lever arm 78 is pivoted about pivot 77 in the clockwise direction, fork 70 will be raised in a generally vertical direction. A third fork member 71 is pivotably supported from above power cord 59 by means of pivot 74 with the tines of fork member 71 projecting on either side of power cord 59. Fork members 69 and 70 are positioned within sound-reproducing apparatus 13 at the left-hand portion of the machine as seen in FIG. 5 with fork member 71 being positioned at the right-hand portion of sound-reproducing apparatus 13 for a purpose which will hereinafter become apparent. Fork members 69 and 71 are interconnected to a bistable switch 82 by means of connector 83 which is also attached to the actuator of switch 82.

A solenoid 76 is operatively connected to lever arm 78 associated with fork 70. Solenoid 76 is operatively connected to a power source such as battery 81 and sound-reproducing actuating switch 80. Upon closing of switch 80, solenoid 76 will thereby be actuated to produce a movement of lever arm 78 and a corresponding movement of fork 70 in a general upward direction as seen in FIG. 9.

An electrical motor 66 is operatively connected to rewind reel 63 by means of shaft 64 and gear reduction drive 65. Motor 66 according to the preferred embodiment is a high-speed DC-operated motor which has a first output shaft connected to gearbox 65 and a second output shaft connected to a fan vane governor 67. Governor 67 is connected to the second output shaft of motor 66 by means of a single-direction spring clutch 68 which connects governor 67 with the second shaft of motor 66 only in one direction of rotation. Motor 66 is operatively connected to bistable switch 82 and a suitable power source such as battery 81. Motor 66 may thus be powered by the same power source which activates solenoid 76 or alternatively separate power sources could be provided for motor 66 and solenoid 76.

With record member 5 operatively positioned within the closure member 14 of sound-reproducing apparatus 13 in the manner as hereinbefore described, book 1 with pages 3 opened will be positioned alongside the sound-reproducing apparatus 13 as shown in FIG. 4. Cursor elements 18 and 20 are then unfolded from the folded position to the extended position as seen in FIG. 4. The operator thereafter moves carriage position detent 41 along the various notches 8 in page stop bar 7 until carriage detent 41 resides in the specific notch 8 which relates to the specific page 3 in the textbook which is to be reproduced. As carriage position detent is thus moved in a longitudinal direction relative to book 1 and the sound-reproducing apparatus 13 the carriage assemblies within sound-reproducing apparatus 13 are moved in the longitudinal direction along shafts 24 and 25 thus moving transducer head 56 and the associated stylus 55 over a particular set of recording grooves 9 as seen in FIG. 2. By thus positioning the carriage position detent 41 the operator has positioned the transducer head 56 in relation to a particular page in the book 1 which is to be reproduced and the associated particular set of recording grooves 9 on record member 5.

Figure 9:
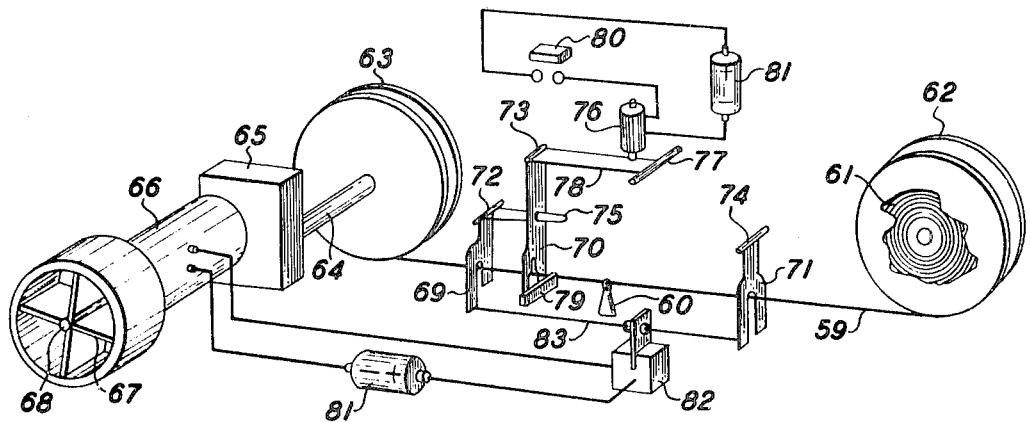
FIG. 9 is a schematic illustration of the control and transducer drive arrangement as contemplated by the present invention.

Transducer head 56 when not in operation, will normally be biased to the left as viewed in FIGS. 5 and 9 with transducer drive link 60 being positioned between fork 69 and fork 70. In this position, transducer connecting link will be biased in a direction to the right as viewed in FIG. 9 against the tines of fork 70 under the influence of spring motor 61. In this position, the stylus 55 will be positioned over the area of record member 5 directly to the left of the head drop zone 10 as seen in FIG. 3.

After positioning of the respective carriage assemblies as hereinabove described, the operator may then move cursor set bar with the attached cursor members 17 and 20 in the longitudinal direction relative to book 1 and sound-reproducing apparatus 13 until the apertures 18 or 21 enclose a particular line of information on the respective page 3 of the book 1 which is to be reproduced. As cursor set bar is thus longitudinally displaced, shafts 24 and 25 are respectively rotated as a result of the operative connection of power cords 34 and 35 between cursor set bar 15 and shafts 24 and 25 respectively. As shafts 24 and 25 are thus rotated, threaded spindle shafts 36 and 42 are likewise rotated which in turn produce a displacement of transducer head 56, stylus 55, carriage bars 49 and 50, and the associated drive mechanism for driving transducer head 56 in relation to the set of grooves 9 as selected by the longitudinal positioning of carriage position detent 41. As cursor set bar 15 is thus longitudinally positioned, a particular one of the grooves 12 in the set of grooves 9 is selected for generating an audio playback of the recorded information. Thus, with the stylus 55 positioned to engage a selected one of the grooves 12, actuating switch 80 on cursor set bar 15 is depressed to close the circuit between power source 81 and solenoid 76. As solenoid 76 is thus actuated, lever arm 78 is pivoted in a clockwise direction about pivot 77 which thus raises fork 70 over latch block 79 and transducer connecting link 60, thus releasing transducer connecting link 60 and transducer head 56 to move in the direction to the right as viewed in FIGS. 5, 7 and 9. As transducer head 56 is thus released for movement to the right, the portions of transducer support arms 57 and 58 extending into the common grooves at the left end of carriage bars 49 and 50 as seen in FIG. 7 moves from the common groove into the lower playback grooves 51 lowering transducer head 56 and stylus 55 toward record member 5. As transducer head 56 and stylus 55 are thus lowered, stylus 55 approaches record member 5 in the head drop zone as seen in FIG. 3. As stylus 55 continues to progress to the right as viewed in FIGS. 5 and 7, stylus 55 engages the selected groove 12 in the transition zone 11 thus further aligning the transducer head 56 and stylus 55 for generation of the recorded information.

As transducer head 56 is moved to the right as seen in FIGS. 5 and 7 under the influence of spring motor 61, power cord 59 drives rewind reel 63 and shaft 64 in a counterclockwise direction. As shaft 64 is thus driven, the second output shaft of motor 66 is driven in a direction which drives fan vane governor 67 via clutch 68. Fan vane governor 67 due to the viscosity of the air passing therethrough acts as a retarding force against spring motor 61 to further impart a very stable constant speed movement to transducer head 56 across record member 5. As transducer head 56 reaches the right-hand edge of record member 5 as seen in FIGS. 5 and 7, the follower portions associated with transducer support arms 57 and 58 will enter the common portion of grooves 51 and 52 at the right-hand end of carriage bars 49 and 50 and transducer head 56 will be raised from record member 5. As transducer support arms thus are raised passing over bistable element 54, stylus 55 is thus retracted from engagement with record member 5.

At the end of travel of transducer head 56 in the common terminating portion of grooves 51 and 52, transducer head connecting link 60 engages the tines of fork 71 displacing fork 71 in a counterclockwise direction about pivot 74 as seen in FIG. 9. As fork 71 is thus displaced, fork 69 will be pivoted in the counterclockwise direction about pivot 69 via connecting cord 83 which in turn raises fork 70 via tine 75. In the raised position, fork 70 is in a position to permit transducer connecting link 60 to contact fork 69. As fork 71 is thus displaced, corresponding displacement of the actuator associated with switch 82 is produced by means of connecting cord 83 thus closing the circuit to motor 66 to activate motor 66. As motor 66 is thus activated shaft 64 will be driven in the clockwise direction as seen in FIG. 9. As reel 63 is thus wound in the clockwise direction, power cord 59 will be wound from drive reel 62 onto rewind reel 63 retracting transducer head 56 to the left as seen in FIGS. 5 and 7. As transducer head 56 is thus advanced to the left, the follower portions associated with transducer support arms 57 and 58 pass over bistable elements 54 directing the follower portions of transducer support arms 57 and 58 into the upper groove 52 in carriage bars 49 and 50. As motor 66 is thus driven, the fan vane governor 67 will be disconnected from the shaft of motor 66 by means of the one-way clutch 68.

As transducer head 56 thus is driven in the direction to the left as seen in FIGS. 5 and 7, under the influence of motor 66, transducer connector link 60 passes beneath the tines of fork 70 which is in the raised position, to engage the tines of fork 69. As transducer head connecting link 60 thus engages fork 69, fork 69 is pivoted in the clockwise direction about pivot 72 thus moving the actuator of switch 82 to the off position under the influence of connecting cord 83. As fork 69 is thus pivoted in the clockwise direction about pivot 72 the tine 75 connected therewith will similarly be pivoted in a clockwise direction about pivot 72 which in turn displaces fork 70 toward power cord 59 into a position to engage transducer connector link 60. With motor 66 thus inactivated, power cord 59, transducer head connecting link 60, and transducer head 56 are again driven to the right as seen in FIGS. 7 and 9 under the influence of spring motor 61. As reel 63 is thus driven, so also is shaft 64 and the second output shaft of motor 66 via the gear reduction drive 65. In this direction, fan vane governor 67 is operatively connected to the second output shaft of motor 66 via clutch 68 to retard the movement of transducer head 56 and thus produce a constant speed movement of transducer head 56.

As transducer head connector link 60 engages fork 70, movement of transducer head 56 to the right is interrupted, pending further activation by means of switch 80. In this position, transducer head 56 and stylus 55 are situated at the start position ready for additional positioning of the carriage assembly for generating an audio output of additional recorded information or alternatively to generate an audio output of the same information as was previously generated.

From the foregoing, it may thus be seen that there is provided an improved arrangement for utilizing a book in conjunction with a sound-reproducing apparatus to generate an audio presentation from an associated record member, of information contained in the book. While the invention has been described with reference to a preferred embodiment, it will be appreciated by those skilled in the art that various changes may be made and equivalents may be substituted for elements thereof without departing from the true spirit and scope of the invention.

What is claimed is:

1. Apparatus comprising:
    a book containing a plurality of lines of information to be read;
    means registerable with all of said lines of information on said information-bearing means for use as a reading guide;
    means including a transducer for producing sounds from a record in accordance with said information;
    said record containing a plurality of recorded zones, one for each page of said book and said zones containing a plurality of portions, one for each line of information;
    means interconnecting said transducer and said means registerable with said lines of information whereby positioning of said transducer, in substantial alignment with a portion of said a recorded zone corresponding to a particular line of information, is accomplished through movement of said means registerable with said lines of information.

2. Apparatus according to claim 1 including means for positioning said transducer adjacent one of said recording zones depending upon the page to be read from said book.

3. Apparatus according to claim 2 wherein said record forms an integral part of said book and said means for producing sounds therefrom further comprises a closure member having an opening through which said record is insertable and through which said means for positioning said transducer adjacent one of said recording zones is accessible for manipulation thereof.

4. Sound-reproducing apparatus comprising:
    a closure member;
    transducer means;
    means supporting said transducer in said closure member for movement relative to a record bearing a plurality of zones of recorded information;
    means for moving said supporting means in a first direction to position said transducer adjacent one of said zones; and
    means for moving said transducer in said first direction relative to said support means and between the beginning and end of said one of said zones, said transducer moving means being out of contact from said record.

5. Apparatus according to claim 4 wherein said supporting means comprises shaft means having a spindle shaft slidably carried by said shaft means.

6. Apparatus according to claim 4 wherein said means for moving said transducer relative to said support comprises externally threaded spindle means supported for rotation by a pair of rotatable splined shafts and said support comprises a carriage assembly; and
    wherein said carriage assembly is operatively coupled to the external threads of said spindle means for movement thereby in response to rotation of said shafts.

7. A book;
    a record attached to said book, said record comprising a plurality of recorded zones each corresponding to at least one page of said book;
    sound-reproducing means including a housing having an opening for receiving said record, said sound-reproducing means comprising a stylus;
    means supporting said stylus for movement in a first direction;
    means for moving said support means for effecting movement of said stylus in a first direction for placing said stylus adjacent one of said recorded zones;
    means for moving said stylus in said first direction and relative to said support means for positioning said stylus in substantial alignment with a portion of said one of said zones;
    means for moving said stylus in a second direction transverse to said first direction for effecting reproducing of said one of said recorded zones; and
    means forming a part of said sound-reproducing means and registerable with information on said pages and being movable between the beginning and end of said information, said means being operatively connected to said means for moving said stylus in said first direction relative to said support means to thereby effect such movement of said stylus upon movement of said registerable means.

* * * * *